Oct. 16, 1934.  A. L. WALLACE  1,977,563
CONTINUOUS VULCANIZER
Filed Aug. 10, 1932  5 Sheets-Sheet 1
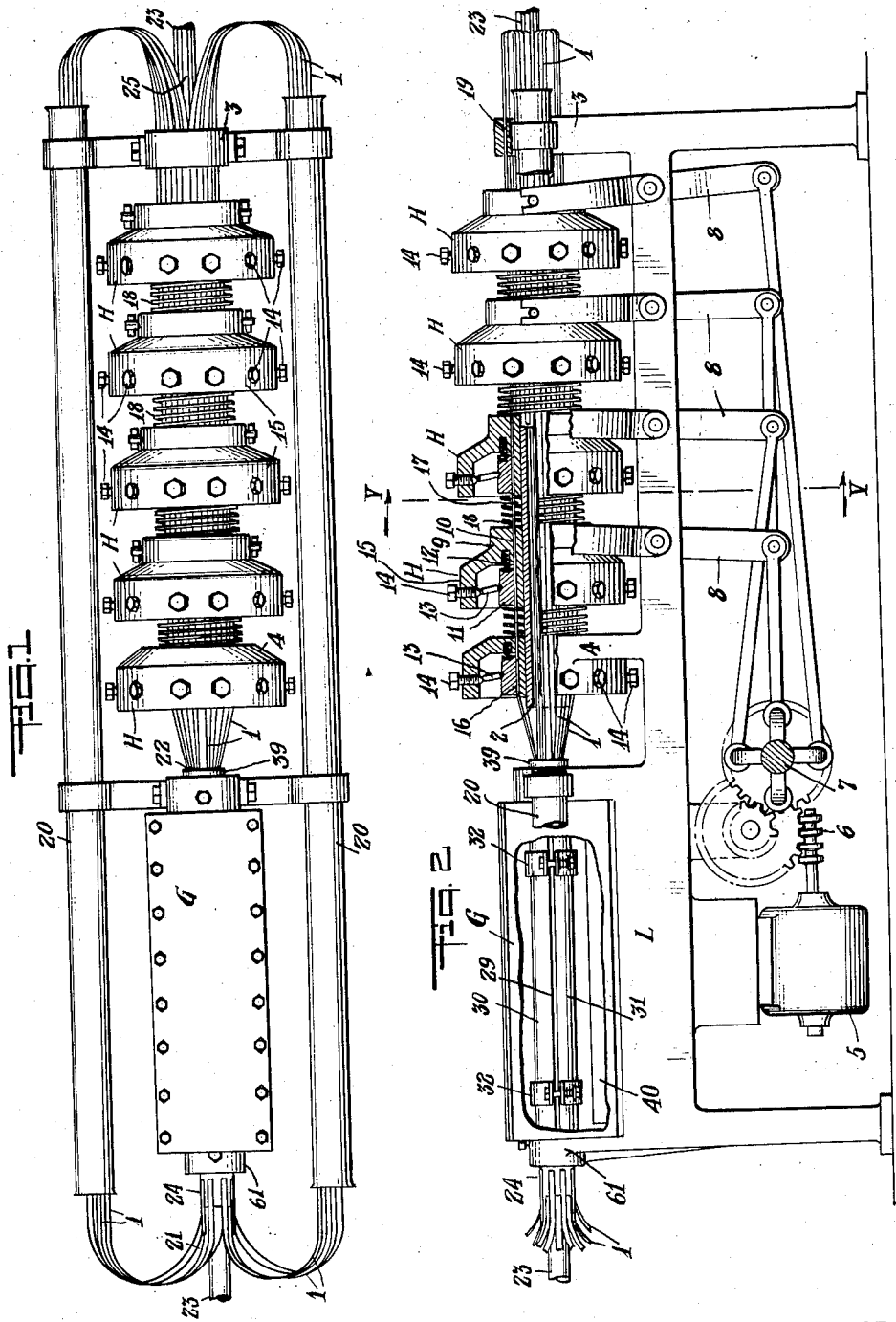
INVENTOR
Archibald L. Wallace
BY
ATTORNEY

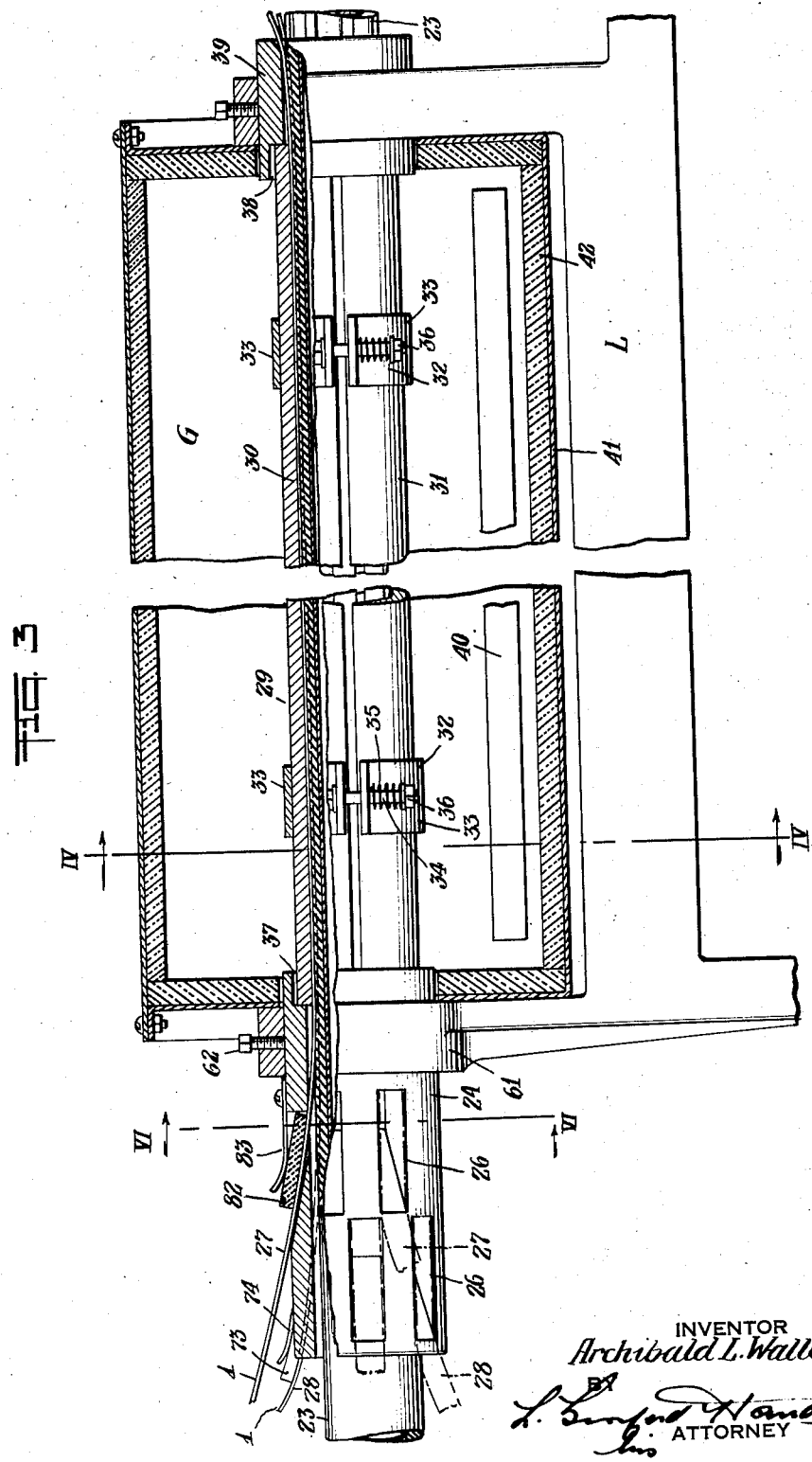

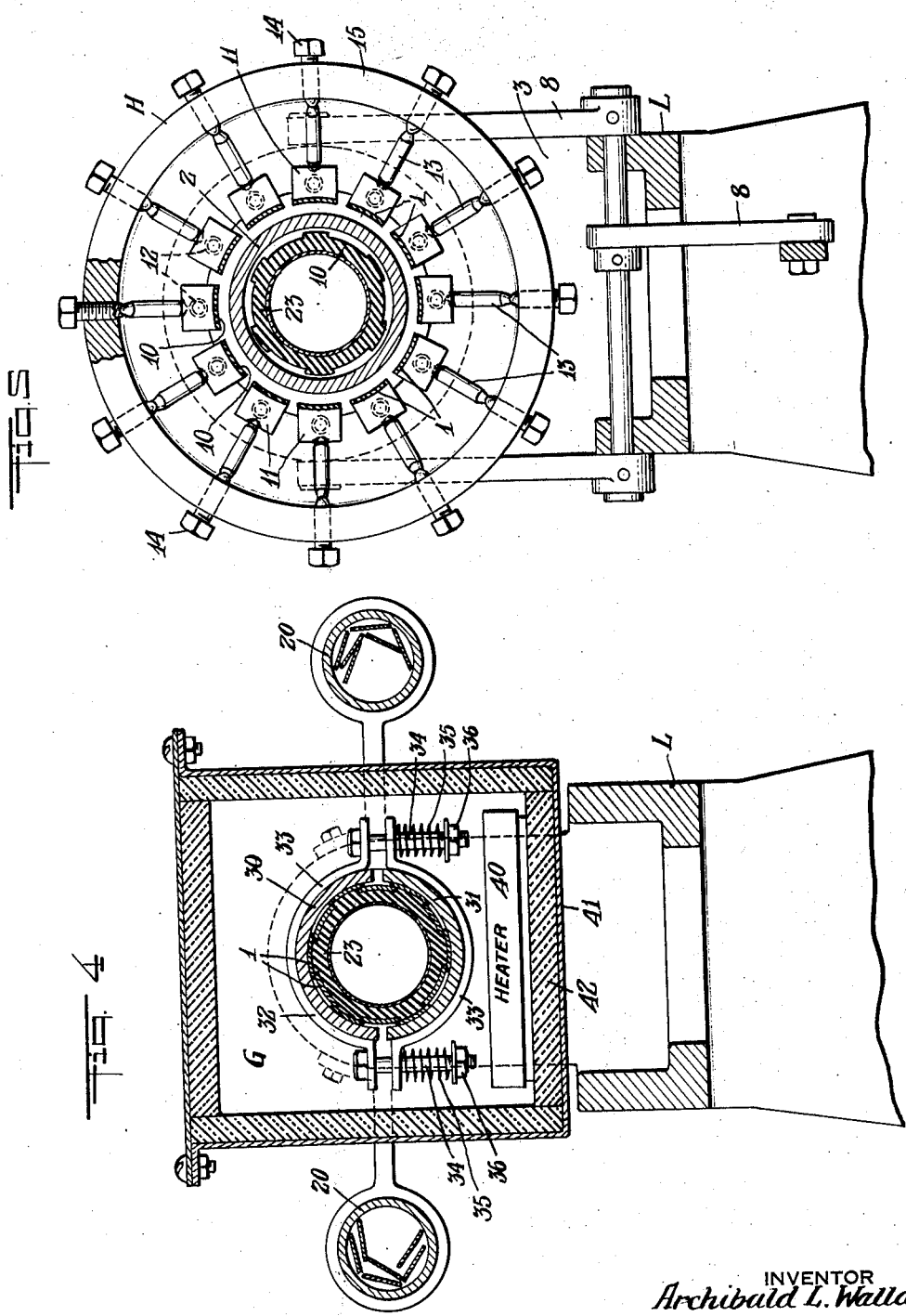

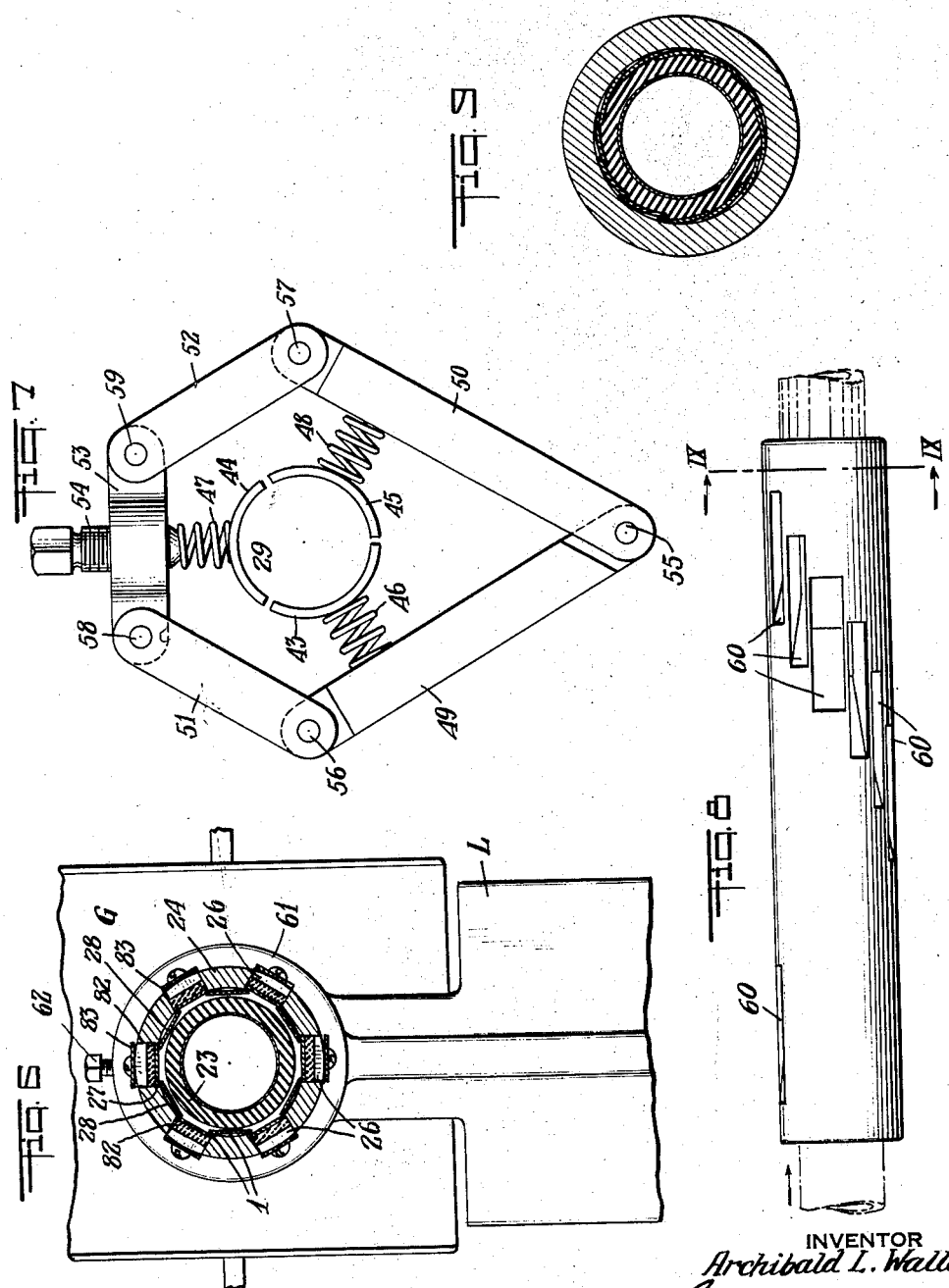

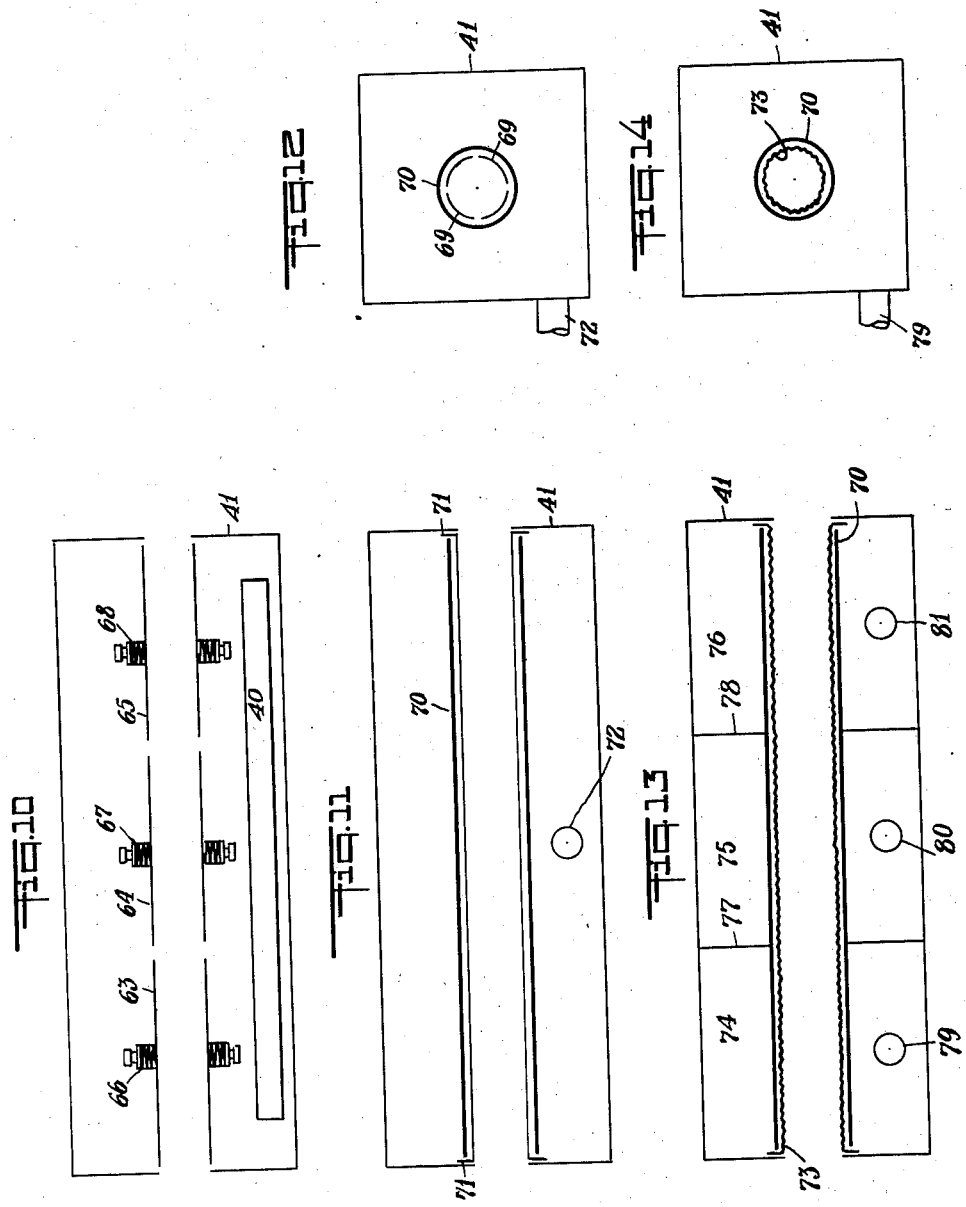

Patented Oct. 16, 1934

1,977,563

UNITED STATES PATENT OFFICE 1,977,563

CONTINUOUS VULCANIZER

Archibald L. Wallace, Brooklyn, N. Y.

Application August 10, 1932, Serial No. 628,115

20 Claims. (Cl. 18—6)

This invention relates to a continuous vulcanizer for use in the production of rubber hose, belting and the like, the same being in the nature of an improvement of the device shown in my pending application Serial No. 596,961, filed March 5th, 1932.

An object of the present invention is to provide a machine which will be simple and efficient in operation and which will embody improved means for effecting a proper positioning and a proper movement of the metallic ribbons of the type as suggested in said pending application.

A further and more detailed object is to provide an efficient means for moving the ribbons.

A further detailed object is to provide improved means by which to insure the proper positioning of the ribbons in a desired overlapping relationship with each other as they move into engagement with the rubber.

A further object is to so construct the machine as to include a heater comprising a pressure tube for the passing rubber said tube being expansible and the amount of expansion being capable of regulation.

A further object is to so construct the machine that any desired number of ribbons may be employed and so that said ribbons, when of endless type, are not required to be of equal length.

A further object is to so construct the machine that it may be readily altered to cause the ribbons to overlap in different desired relationships for thereby altering the surface configuration of the hose produced from time to time at the will of the operator.

A further object is to so construct the machine that the pressure tube thereof may be capable of independent adjustment at different points along its length.

A further object is to so construct the machine that steam pressure may be employed as the means for both heating and pressing the pressure tube.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claims.

In the accompanying drawings which are to be taken as a part of this specification, and in which I have shown merely a preferred form of embodiment of the invention:—

Fig. 1 is a top plan view of a machine constructed in accordance with this invention.

Fig. 2 is a side elevational view of the structure appearing in Fig. 1, parts being broken away and shown in vertical section.

Fig. 3 is an enlarged vertical sectional view through the heater end portion of the machine.

Fig. 4 is a transverse sectional view substantially upon the plane of line IV—IV of Fig. 3.

Fig. 5 is a similarly enlarged sectional view taken substantially upon the plane of line V—V of Fig. 2.

Fig. 6 is a similarly enlarged view taken upon the plane of line VI—VI of Fig. 3.

Fig. 7 is a detail sectional view similar to the central portion of Fig. 4 but illustrating a modified means of holding the parts of the heating tube yieldingly in position.

Fig. 8 is a detail view illustrating a modified or alternately usable form of ribbon guiding tube.

Fig. 9 is a transverse sectional view upon the plane of line IX—IX of Fig. 8 for illustrating the manner in which the ribbons are positioned upon the passing hose by the guide tube of Fig. 8.

Fig. 10 is a diagrammatic view of a vulcanizing chamber containing a further modified form of pressure tube.

Fig. 11 is a similar diagrammatic view of a vulcanizing chamber containing a still further modified form of pressure tube.

Fig. 12 is a diagrammatic transverse sectional view of the structure shown in Fig. 11 and Figs. 13 and 14 are diagrammatic views similar to Figs. 11 and 12 but illustrating a still further modified form.

Referring to the drawings for describing in detail the structure illustrated therein, the reference character L indicates a main frame which carries at one end a vulcanizing chamber G and at its other end a series of gripping devices as H—H which operate to move the ribbons 1—1 steadily through the vulcanizing chamber.

There may be any desired number of the gripping devices H but usually four is sufficient to impart a continuous and smoothly advancing movement of the ribbons.

The several gripping devices are mounted to slide longitudinally along a hollow tube 2 which is immovably supported by its opposite ends in stationary supports 3 and 4 and they are connected to be moved by power derived from a suitable source, such as the motor 5, the connections from the motor as illustrated in the present instance consisting of a worm pinion 6 operating through a suitable set of gears to turn a crank shaft 7 which carries a plurality of connecting rods in different radial positions and operating respectively a similar number of rock levers as 8—8 one of which is connected with each of the gripping devices.

The gripping devices may be of any approved type but as illustrated each consists of a sleeve portion as 9 which slides freely in engagement with the tube 2 and which has a series of passage-ways as 10—10 therethrough one for each of the ribbons 1 employed in the machine, said passage-ways being spaced apart equi-distant circumferentially of the sleeve and each having associated therewith a clamp block as 11 which is yieldably held against the respective ribbon by a compression spring 12 in co-operation with an inclined floating link 13 one end of which presses against the block 11 and the other end of which is engaged by an adjustable set screw 14 mounted in an annular rim portion 15 extending from the sleeve 9. The pressure of the spring 12 tends continually to move the block 11 in a direction to straighten up the link 13, and hence to urge the block as a clamp against the outer surface of the ribbon, the inner surface of the ribbon meanwhile resting firmly against the opposing wall surface of the passage-way 10.

By this arrangement the gripping devices are able to move in one direction, toward the left Figs. 1 and 2, without imparting movement to the ribbons, but as soon as the gripping device begins to move in the opposite direction, that is toward the right Figs. 1 and 2, the several clamp blocks will immediately wedge against their ribbons so as to grip said ribbons and carry them along with the gripping device until the gripping device again reverses its direction of movement.

The relationship of the several cranks of the crank shaft 7 is such that the several gripping devices H will be moved in a properly timed relationship to each other, so that at least one thereof will always be carrying the ribbons in a direction away from the vulcanizing chamber and so that thus the ribbons will be caused to move steadily and substantially with uniform speed through the machine.

The support 4 is constructed so as to include a series of clamp blocks 16 substantially identical with those embodied in the gripping devices H. This support being stationary however the gripping devices thereof serve only as a means to restrain the ribbons against any tendency to buckle back toward the vulcanizing chamber such as might occur incident to movement of the gripping devices toward the vulcanizing chamber. The clamp blocks 16 permit easy movement of the ribbons in a direction away from the vulcanizing chamber but constitute a safety device to prevent any return movement of the ribbons toward the vulcanizing chamber.

In order to prevent possible buckling of the ribbons in the space between the several gripping devices, and likewise in the space between the support 4 and the next adjacent gripping device, said spaces are preferably fitted with suitable expansible ribbon supporting guides. In the instance illustrated these guides consist each of two separate coil springs one thereof, as 17, being positioned directly about the tube 2 so that its outer annular surface provides a rest for the relatively inner surface of the ribbons, and the other thereof, as 18, being positioned about the ribbons collectively so that its inner annular surface engages the outer surface of the ribbons in a suitable manner so that, in co-operation with the spring 17, the ribbons will be held against buckling. The springs 17 and 18 become compressed and distended in accordance with the movements of the gripping devices, but always the several convolutions thereof maintain suitably close proximity to each other for the proper support of the ribbons.

The support 3, which is at the extreme end of the machine, is preferably formed with passage-ways as 19 therethrough, similar in general position to those occurring in the support 4 and in the gripping devices, the ribbons being threaded through said passage-ways 19 where said ribbons pass out of the last gripping device H adjacent to the support 3.

The passage-ways 10 and 19 throughout the several supports and gripping devices are in aligned relation so that they serve to hold the several ribbons conveniently spaced about the tube 2.

The ribbons are each preferably of an endless construction and after leaving the support 3 they return to the opposite end of the machine. A pair of smooth bore ribbon supporting tubes 20—20 of suitable size may be mounted one at each of the opposite sides of the machine, as indicated, for the neat and convenient return passage of the ribbons to the opposite or vulcanizing end of the machine. At said opposite or vulcanizing end of the machine the ribbons move out of the guide tubes 20 and pass into the vulcanizing chamber G as at 21 from whence they emerge as at 22 for movement through the passage-ways of the support 4 and through the gripping devices again, as above described.

The rubber hose or other article, as 23, which is to be vulcanized enters the machine at the vulcanizing end of the machine through a ribbon-guiding-tube 24 and passes therefrom into and through the vulcanizing chamber G emerging from said chamber at the opposite end thereof and passing through the interior of the tube 2 in its vulcanized condition, being discharged from the machine at the outer end of said tube 2 as at 25. The tube 2 serves merely as a loose conduit through which the completed hose moves for discharge after being acted upon within the vulcanizing chamber.

The ribbon-guiding-tube 24 is formed with a series of appropriately shaped openings as 26—26 through its side walls one for each of the ribbons employed in the machine. These openings are so positioned as to receive and direct the ribbons each to an appointed position against the surface of the hose or the like as 23. In the structure now under description they are arranged in two separate sets one set being disposed forward of the other lengthwise of the tube 24, and the openings of one set standing in radial planes intermediate the openings of the other set and all being uniformly spaced circumferentially of the tube so that as the ribbons move into their respective openings those, as indicated 27—27 in Figs. 3 and 6, which pass through the openings of the forward set will overlie, upon the surface of the hose adjacent marginal edge portions of those, as indicated 28—28 in Figs. 3 and 6, which pass through the rear set. In this manner the several ribbons collectively move into the vulcanizing chamber as a metallic sheath entirely surrounding the hose or the like as 23.

The vulcanizing chamber may be of any appropriate construction. It includes essentially a pressure tube as 29 for insuring appropriately tight pressure of the ribbons against the material of the hose during the time while the hose and ribbons are passing through the vulcanizing chamber, and a suitable means for supplying the requisite heat.

In the instance illustrated the pressure tube is made up of two separate semi-cylindrical longitudinal sections as 30 and 31 held resiliently pressed toward each other in cylinder forming relationship by a plurality of spring clamps as 32—32. The clamps illustrated consist each of a pair of yokes as 33—33 engaging about the semi-cylindrical sections respectively and connected together by bolts as 34 each of which is fitted with a compression spring as 35 to hold the yokes resiliently urged toward each other. The bolts carry adjustable nuts as 36 thereon engaging the springs so that the power of the springs may be adjustably altered at will, thereby to determine as occasion may require it the pressure of the semi-cylindrical sections 30 and 31 against the ribbons and hose, and at the same time always facilitate a desirable amount of movement of the semi-cylindrical sections away from each other to resiliently accommodate the slight expansion of the hose incident to the vulcanizing operation.

The pressure tube structure 29 in its entirety is mounted loosely within suitable sockets as 37 and 38 at opposite ends of the vulcanizing chamber the former being provided concentric in the inner end of the ribbon-feeding-tube 24 and the latter being provided concentric in the opposing inner end of a discharge tube 39 located at the discharge end of the vulcanizing chamber, said tube 39 being similar to the tube 24, except that it has no ribbon openings such as those indicated at 26 of the tube 24. In leaving the vulcanizing chamber the ribbons merely pass out of the central bore of the tube 39 and spread radially into the passage-ways 10 of the support 4 as hereinabove referred to, and as clearly indicated in the drawings.

As the ribbons are drawn into the pressure tube the pressure of said tube against the ribbons causes them to become embedded into the soft rubber material of the hose or the like and to remain in this embedded relation throughout the period of passage of a given portion of the ribbons through the vulcanizing chamber.

Since the several ribbons stand as a lining for the pressure tube and as the only elements which have tight engagement with the surface of the hose they collectively constitute a conveyor causing the hose to move steadily through the machine as the ribbons are drawn along by the several gripping devices H the vulcanizing operation progressing as the hose moves along and being completed upon any given section of the hose by the time said section emerges from the vulcanizing chamber.

In the structure illustrated the heat for heating the pressure tube and vulcanizing the passing rubber is supplied by a heater of appropriate form indicated at 40, said heater being contained within a box as 41 lined heavily with heat resisting insulation as 42 and containing also the pressure tube.

The structure shown in Fig. 7 illustrates a modified form of the pressure tube and the manner of holding its several longitudinal segments yieldingly in cylindrical relationship. In this instance three separate segments as 43, 44 and 45 are indicated and three separate springs as 46, 47 and 48 are arranged to bear radially inwardly against said sections respectively. The means illustrated for pressing these springs toward their respective segments, and for adjusting the pressure exerted against said segments consists of a series of links as 49 50 51 52 and 53 and a set screw 54. The links 49 and 50 are pivotally connected together by one end as at 55 and have their opposite ends pivotally connected as at 56 and 57 with adjacent ends respectively of links 51 and 52 the opposite ends of links 51 and 52 being pivotally connected as at 58 and 59 with opposite ends of the link 53, and the set screw 54 being threaded through the link 53 to bear against the outer end of one of the springs as 47. The outer ends of springs 46 and 48 bear against the links 49 and 50.

This system of linkage surrounds the pressure tube and it will be apparent that by adjustment of the screw 54 said linkage will result in a substantially equal increase or reduction in pressure of all of the springs against their respective pressure tube segments.

As in the instance of the pressure applying device 32 hereinabove described, there may be any desired number of these pressure applying devices along the length of the pressure tube, each operating independently of the other but all co-operating to the desired end, and all being independently adjustable so that pressure of the tube segments against the passing ribbons and hose may be increased or diminished at any point lengthwise of the pressure tube as may be found by the operator to be conducive to the production of the best results in the vulcanizing operation.

The structure illustrated in Figs. 8 and 9 illustrates a modified form of ribbon-guiding-tube. In principle the tube shown in these figures is similar to that already described, and the structure differs only in the arrangement of the openings through which the ribbons move into engagement with the passing rubber. In the present instance the openings, as indicated 60—60, are shown as stepped progressively one behind the other longitudinally and circumferentially of the tube so that as the ribbons move through said opening each ribbon will overlie the margin of one neighbor and underlie the margin of the other, the ribbons thereby occupying the positions approximately as indicated in the sectional view Fig. 9.

The ribbon-guiding-tube, whether constructed as in Fig. 3, or as in Fig. 8, or otherwise, is preferably mounted so as to be readily removable from the machine to facilitate the substitution of a feeding tube of a different structure at the will of the operator. Whenever the operator desires to produce a hose of a different surface configuration he has merely to substitute an appropriate form of ribbon-guiding-tube for that already in the machine, thereby causing the ribbons to be fed against the hose in the necessary relationship to produce the desired surface contour of the hose.

As a simple means to facilitate the substitution of ribbon-feeding tubes the drawing herewith, Fig. 3, shows the tube 24 as being removably held within a support 61 formed as a part of the main frame L, a simple set screw as 62 being illustrated as a means for retaining the tube against accidental displacement.

It is noted also that removal of a ribbon-feeding-tube will so release the pressure tube that the pressure tube may if desired be lifted out of the machine for the purpose of repairs or otherwise.

A machine constructed as herein disclosed is of simple and practical form and may be relied upon for continuous operation in the vulcanizing of hose or the like of any desired length.

It is important to note that by reason of the manner in which the several ribbons employed are propelled or drawn through the machine it is immaterial whether said ribbons be of an endless form or not, and it is further immaterial whether, if of endless form, the loops defined by the several ribbons are of uniform length.

The structure shown in Fig. 10 illustrates a modified form of the pressure tube in which said tube is made up of a plurality of sections as 63, 64 and 65 longitudinally of its length, it being understood that each of these sections is independently yieldingly expansible in accordance with the principle as hereinabove set forth, either by being made up of segmental semi-spherical sections or otherwise. In this figure each of the sections 63, 64 and 65 is provided with a separate spring pressure applying device as 66, 67 and 68 respectively, and it will be seen accordingly that the pressure exerted against the passing ribbons and rubber tube may be regulated so as to be the same or different at various points lengthwise of the pressure tube, according as the skill of the operator may dictate in the effort to produce a satisfactory vulcanized article.

The structure shown in Figs. 11 and 12 illustrates a still further modified form of the pressure tube, in association with a heating means. In this instance it is proposed that the interior portion of the pressure tube may be of any desired construction, for instance segmental as indicated at 69—69, and that it may be surrounded by a flexible air tight tube, such as the piece of rubber tubing 70. The opposite ends of the pressure tube in this case are suitably connected with the walls of the heat-box 41, as at 71—71, so that steam pressure, entering through an opening 72, may be utilized within the heat-box as the means of supplying both heat and pressure to the pressure tube.

The structure shown in Figs. 13 and 14 is similar to that described with respect to Figs. 11 and 12 except that in this instance it is proposed that the interior portion as 73 of the pressure tube may, instead of being segmental as heretofore, be itelf made of an expansible or elastic character such for instance as a diagonally woven fabric, so that any portion of the length of said tube may be capable of expansion and contraction independently of any other portion. In these figures also the heat-box is shown as being divided into several compartments as 74, 75 and 76, by partitions 77 and 78 and each of said compartments being independently supplied with steam pressure as through openings 79, 80 and 81. An outer covering of rubber tubing or the like similar to that indicated 70 in Figs. 10 and 12 may be employed surrounding the interior portion 73.

By this arrangement it is possible, by altering the heat and pressure of steam within the different compartments 74, 75 and 76, to alter at will the heat and pressure of the adjacent portion of the pressure tube, as will be readily understood.

In some instances it is desirable to lubricate the outer surface of the several ribbons 1—1, and for this purpose the drawing herewith shows oiling pads as 82—82 positioned to lie in engagement with the outer surface of the ribbons as the ribbons pass into the openings of the guiding tube 24. Suitable springs as 83—83 are arranged to hold these pads in light frictional engagement with the ribbons.

It will of course be understood that while the drawings herewith show this machine to employ twelve of the ribbons 1, obviously any number of said ribbons, either more or less than as herein indicated, may be employed.

As many changes could be made in this construction without departing from the scope of the invention as defined in the following claims, it is intended that all matter contained in the above description, or shown in the accompanying drawings, shall be interpreted as illustrative only and not in a limiting sense.

Having thus described my invention what I claim as new and desire to secure by Letters Patent is:—

1. A vulcanizing machine comprising means forming a vulcanizing chamber having a tubular bore therethrough within which work is to be vulcanized and through which the work is to be moved, a ribbon of flexible material movable through said bore between the work and the surface of the bore, and propelling means for said ribbon comprising a plurality of reciprocating gripping devices having parts to grip and move the ribbon when said devices move in one direction, together with means for operating said gripping devices.

2. A vulcanizing machine comprising means forming a vulcanizing chamber having a tubular bore therethrough within which work is to be vulcanized and through which the work is to be moved, a ribbon of flexible material movable through said bore between the work and the surface of the bore, and propelling means for said ribbon comprising a plurality of gripping devices movable back and forth lengthwise of the ribbon and having parts to grip and move the ribbon when said devices move in one direction but permitting movement of the devices without corresponding movement of the ribbon when the devices move in the opposite direction, and means for moving said gripping devices.

3. A vulcanizing machine comprising means forming a vulcanizing chamber having a tubular bore therethrough within which work is to be vulcanized and through which the work is to be moved, a ribbon of flexible material movable through said bore between the work and the surface of the bore, and propelling means for said ribbon arranged beyond one end of said vulcanizing chamber and thereat engaging said ribbon, said propelling means including a gripping device mounted to move in a direction away from the vulcanizing chamber and having means to grip the ribbon so that the ribbon will move positively therewith, together with means for so moving the gripping device.

4. A vulcanizing machine comprising means forming a vulcanizing chamber having a tubular bore therethrough within which work is to be vulcanized and through which the work is to be moved, a ribbon of flexible material movable through said bore between the work and the surface of the bore, a gripping device beyond one end of the vulcanizing chamber of a character to permit movement of the ribbon in one direction and to prohibit movement of the ribbon in the opposite direction, and means to move the ribbon in the direction permitted by said gripping device.

5. A vulcanizing machine comprising means forming a vulcanizing chamber having a tubular bore therethrough within which work is to be vulcanized and through which the work is to be moved, a ribbon of flexible material movable through said bore between the work and the surface of the bore, a gripping device beyond one end of the vulcanizing chamber of a character to permit movement of the ribbon in one direction and to prohibit movement of the ribbon in the opposite direction, and a device mounted to move back and forth along the ribbon of a character to move the ribbon in the direction permitted by said gripping device, together with operating means for said last mentioned device.

6. A vulcanizing machine comprising means forming a vulcanizing chamber having a tubular bore therethrough within which work is to be vulcanized and through which the work is to be moved, a ribbon of flexible material movable through said bore between the work and the surface of the bore, a gripping device beyond one end of the vulcanizing chamber of a character to permit movement of the ribbon in one direction and to prohibit movement of the ribbon in the opposite direction, a plurality of other gripping devices mounted to move back and forth along the ribbon each of a character to grip and move the ribbon in the direction permitted by said first gripping device, and means for moving said mentioned other gripping devices.

7. A vulcanizing machine comprising means forming a vulcanizing chamber having a tubular bore therethrough within which work is to be vulcanized and through which the work is to be moved, a ribbon of flexible material movable through said bore between the work and the surface of the bore, a gripping device beyond one end of the vulcanizing chamber of a character to permit movement of the ribbon in one direction and to prohibit movement of the ribbon in the opposite direction, a plurality of other gripping devices mounted to move back and forth along the ribbon each of a character to grip and move the ribbon in the direction permitted by said first gripping device, and means for moving said mentioned other gripping devices, together with supporting means for the ribbon located intermediate said gripping devices.

8. A vulcanizing machine comprising means forming a vulcanizing chamber having a tubular bore therethrough within which work is to be vulcanized and through which the work is to be moved, a ribbon of flexible material movable through said bore between the work and the surface of the bore, a gripping device beyond one end of the vulcanizing chamber of a character to permit movement of the ribbon in one direction and to prohibit movement of the ribbon in the opposite direction, a device mounted to move back and forth along the ribbon of a character to move the ribbon in the direction permitted by said gripping device, said last mentioned device being spaced away from the gripping device, supporting means for the ribbon arranged in said mentioned space, and operating means for said last mentioned device.

9. A vulcanizing machine comprising means forming a vulcanizing chamber having a tubular bore therethrough within which work is to be vulcanized and through which the work is to be moved, a ribbon of flexible material movable through said bore between the work and the surface of the bore, a gripping device beyond one end of the vulcanizing chamber of a character to permit movement of the ribbon in one direction and to prohibit movement of the ribbon in the opposite direction, a plurality of other gripping devices mounted to move back and forth along the ribbon each of a character to grip and move the ribbon in the direction permitted by said first gripping device, and means for moving said mentioned other gripping devices, together with supporting means for the ribbon located intermediate said gripping devices, said supporting means being elastic in the direction of length of the ribbon for the purpose set forth.

10. A vulcanizing machine comprising means forming a vulcanizing chamber having a tubular bore therethrough within which work is to be vulcanized and through which the work is to be moved, a ribbon of flexible material movable through said bore between the work and the surface of the bore, a tube arranged as an extension of the vulcanizing chamber and through which the vulcanized work may move, and means carried by said tube of a character to engage the ribbon and move the ribbon.

11. A vulcanizing machine comprising means forming a vulcanizing chamber having a tubular bore therethrough within which work is to be vulcanized and through which the work is to be moved, a ribbon of flexible material movable through said bore between the work and the surface of the bore, a tube arranged as an extension of the vulcanizing chamber and through which the vulcanized work may move, and means carried by said tube movable longitudinally back and forth therealong of a character to grip the ribbon and move the ribbon in one direction therewith, together with means for moving said mentioned means.

12. A vulcanizing machine comprising means forming a vulcanizing chamber having a tubular bore therethrough within which work is to be vulcanized and through which the work is to be moved, a ribbon of flexible material movable through said bore between the work and the surface of the bore, a tube arranged as an extension of the vulcanizing chamber and through which the vulcanized work may move, and a plurality of gripping devices mounted to slide back and forth along the length of said tube each of a character to grip and move the ribbon in one direction therewith, together with means for moving said gripping devices.

13. A vulcanizing machine comprising means forming a vulcanizing chamber having a tubular bore therethrough within which work is to be vulcanized and through which the work is to be moved, an endless ribbon of flexible material having a portion of its length disposed within said bore between the work and the surface of the bore said ribbon being movable longitudinally through the bore, propelling means for said ribbon arranged to engage a portion of the ribbon beyond the discharge end of the vulcanizing chamber of a character to grip and draw the ribbon through the vulcanizing chamber, and guide means for the ribbon beyond said propelling means adapted to receive the ribbon and guide it again to a point adjacent the entering end of the vulcanizing chamber.

14. A vulcanizing machine comprising means forming a vulcanizing chamber having a tubular bore therethrough within which work is to be vulcanized and through which the work is to be moved, an endless ribbon of flexible material having a portion of its length disposed within said bore between the work and the surface of the bore said ribbon being movable longitudinally through the bore, a tube arranged beyond the discharge end of the vulcanizing chamber to receive the vulcanized work from said chamber, propelling means for said ribbon mounted upon said tube and having parts to engage a portion of the ribbon beyond the discharge end of the vulcanizing chamber of a character to draw the ribbon through the vulcanizing chamber, and guide means for the ribbon beyond said propelling means adapted to receive the ribbon and guide it again to a point adjacent the entering end of the vulcanizing chamber.

15. A vulcanizing machine comprising means forming a vulcanizing chamber having a tubular bore therethrough within which work is to be vulcanized and through which the work is to be moved, a plurality of ribbons of flexible material movable through said bore as a lining therefor between the work and the surface of the bore, and propelling means for said ribbons arranged beyond said vulcanizing chamber of a character to individually grip said ribbons and draw said ribbons through said bore.

16. A vulcanizing machine comprising means forming a vulcanizing chamber having a tubular bore therethrough within which work is to be vulcanized and through which the work is to be moved, a plurality of ribbons of flexible material movable through said bore as a lining therefor between the work and the surface of the bore, propelling means for said ribbons, and means by which different sections of the length of said bore are rendered independently resiliently expansible.

17. A vulcanizing machine comprising means forming a vulcanizing chamber having a tubular bore therethrough within which work is to be vulcanized and through which the work is to be moved, a plurality of ribbons of flexible material movable through said bore as a lining therefor between the work and the surface of the bore, propelling means for said ribbons, and means by which the surface of said bore is rendered resilient so as to be capable of expansive and contractile movement at different points longitudinally thereof.

18. A vulcanizing machine comprising means forming a vulcanizing chamber having a tubular bore therethrough within which work is to be vulcanized and through which the work is to be moved, a plurality of ribbons of flexible material movable through said bore between the work and the surface of the bore each having frictional engagement with the surface of the bore, and collectively constituting means to move the work through the bore, propelling means for said ribbons, and a plurality of separate lubricating devices one for each ribbon disposed to apply lubricant to the outer surface of the respective ribbons as said ribbons enter the bore.

19. A vulcanizing machine comprising means forming a vulcanizing chamber having a tubular bore therethrough within which work is to be vulcanized and through which the work is to be moved, a ribbon of flexible material movable through said bore between the work and the surface of the bore, a tubular member beyond the vulcanizing chamber, actuating means exteriorly of said tubular member to grip and move the ribbon, and said tubular member being disposed so that the interior thereof constitutes a supporting guide for supporting and guiding the vulcanized work past said actuating means.

20. A vulcanizing machine comprising means forming a vulcanizing chamber having a tubular bore therethrough within which work is to be vulcanized and through which the work is to be moved, a plurality of ribbons of flexible material movable through said bore as a lining therefor between the work and the surface of the bore, means to guide said ribbons into longitudinal marginal overlapping relation with each other while within the vulcanizing chamber, and propelling means arranged beyond the vulcanizing chamber having parts for holding the ribbons in non-overlapping relation beyond said chamber and for gripping them and propelling them through the vulcanizing chamber.

ARCHIBALD L. WALLACE.